United States Patent
Krishnamurthy et al.

(10) Patent No.: US 8,478,965 B2
(45) Date of Patent: Jul. 2, 2013

(54) CASCADED ACCELERATOR FUNCTIONS

(75) Inventors: Rajaram B. Krishnamurthy, Wappingers Falls, NY (US); Thomas A. Gregg, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 907 days.

(21) Appl. No.: 12/609,974

(22) Filed: Oct. 30, 2009

(65) Prior Publication Data

US 2011/0107066 A1    May 5, 2011

(51) Int. Cl.
*G06F 15/00* (2006.01)
*G06F 15/16* (2006.01)

(52) U.S. Cl.
USPC .............................. 712/20; 709/232; 709/246

(58) Field of Classification Search
USPC .................................................. 712/34–220
See application file for complete search history.

(56) References Cited

U.S. PATENT DOCUMENTS

| | | | |
|---|---|---|---|
| 6,112,288 A * | 8/2000 | Ullner ............................. | 712/20 |
| 7,386,704 B2 * | 6/2008 | Schulz et al. ................... | 712/15 |
| 2006/0195605 A1 * | 8/2006 | Sundarrajan et al. ......... | 709/232 |
| 2007/0220170 A1 * | 9/2007 | Abjanic et al. ................ | 709/246 |
| 2007/0245021 A1 * | 10/2007 | Ohtsuka et al. ............... | 709/225 |
| 2007/0300044 A1 * | 12/2007 | Moyer et al. ................... | 712/34 |
| 2008/0028103 A1 * | 1/2008 | Schlansker et al. ........... | 709/250 |
| 2008/0091855 A1 * | 4/2008 | Moertl et al. ................... | 710/52 |
| 2008/0104223 A1 * | 5/2008 | D'Amora et al. ............. | 709/224 |
| 2010/0058031 A1 * | 3/2010 | Aho et al. ....................... | 712/42 |

FOREIGN PATENT DOCUMENTS

| | | |
|---|---|---|
| JP | 2007265208 A | 10/2007 |
| WO | WO03103251 A1 | 12/2003 |
| WO | WO2004042560 A2 | 5/2004 |

* cited by examiner

*Primary Examiner* — Don Wong
*Assistant Examiner* — Mohammad Kabir
(74) *Attorney, Agent, or Firm* — Steven Chiu, Esq.; Blanche E. Schiller, Esq.; Heslin Rothenberg Farley & Mesiti P.C.

(57) ABSTRACT

Accelerator functions are cascaded, such that a result of one accelerator function is directly forwarded to another accelerator function, bypassing the processor requesting the functions to be performed. The cascading may be provided during compilation of a program specifying the functions to be performed, but can be dynamically reversed during runtime of the program.

20 Claims, 7 Drawing Sheets

CASCADED ACCELERATOR FUNCTIONS

BACKGROUND

This invention relates, in general, to facilitating processing within a computing environment, and in particular, to improving efficiency within the computing environment when using accelerators to perform specific processing functions.

Accelerators are used today to increase the processing capabilities of a server. In particular, accelerators coupled to the server are optimized to perform certain functions, enabling those functions to be performed at higher speeds than if those functions were performed by the server. When a function is reached in a program executed by the server, the server sends a request to an accelerator to perform the function. The accelerator performs the function and forwards the result back to the server. The server either performs further processing on the returned result or simply forwards the result to another accelerator, which then performs processing on the result and sends the result back to the server, again.

These loop-back traversals to the server are performed due to call return semantics popular in certain acceleration structures.

BRIEF SUMMARY

In accordance with an aspect of the present invention, the return path to the server from the accelerator is eliminated when possible. Instead, the traffic in the accelerator cloud is localized allowing direct routing from one accelerator function to another accelerator function, referred to herein as cascading or short-circuiting. This avoids nest traffic on the server, reduces latency and reduces latency induced bandwidth effects.

The shortcomings of the prior art are overcome and additional advantages are provided through the provision of a computer program product for facilitating processing within a computing environment. The computer program product includes a storage medium readable by a processing circuit and storing instructions for execution by the processing circuit for performing a method. The method includes, for instance, determining whether a result of an accelerator function is to be forwarded to another accelerator function, the accelerator function encountered in a program and to be processed by an accelerator; and, in response to the determining indicating the result is to be forwarded to the another accelerator function, generating machine code to provide the result directly to the another accelerator function, bypassing a processor to execute the program.

Methods and systems relating to one or more aspects of the present invention are also described and claimed herein. Further, services relating to one or more aspects of the present invention are also described and may be claimed herein.

Additional features and advantages are realized through the techniques of the present invention. Other embodiments and aspects of the invention are described in detail herein and are considered a part of the claimed invention.

BRIEF DESCRIPTION OF THE SEVERAL VIEWS OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Currently, in typical server-based acceleration environments, a server issues a request to an accelerator to perform a particular function, and pursuant to call-return semantics, the result of that function is automatically returned from the accelerator to the server. This is described further with respect to FIG. 1.

Figure 1:
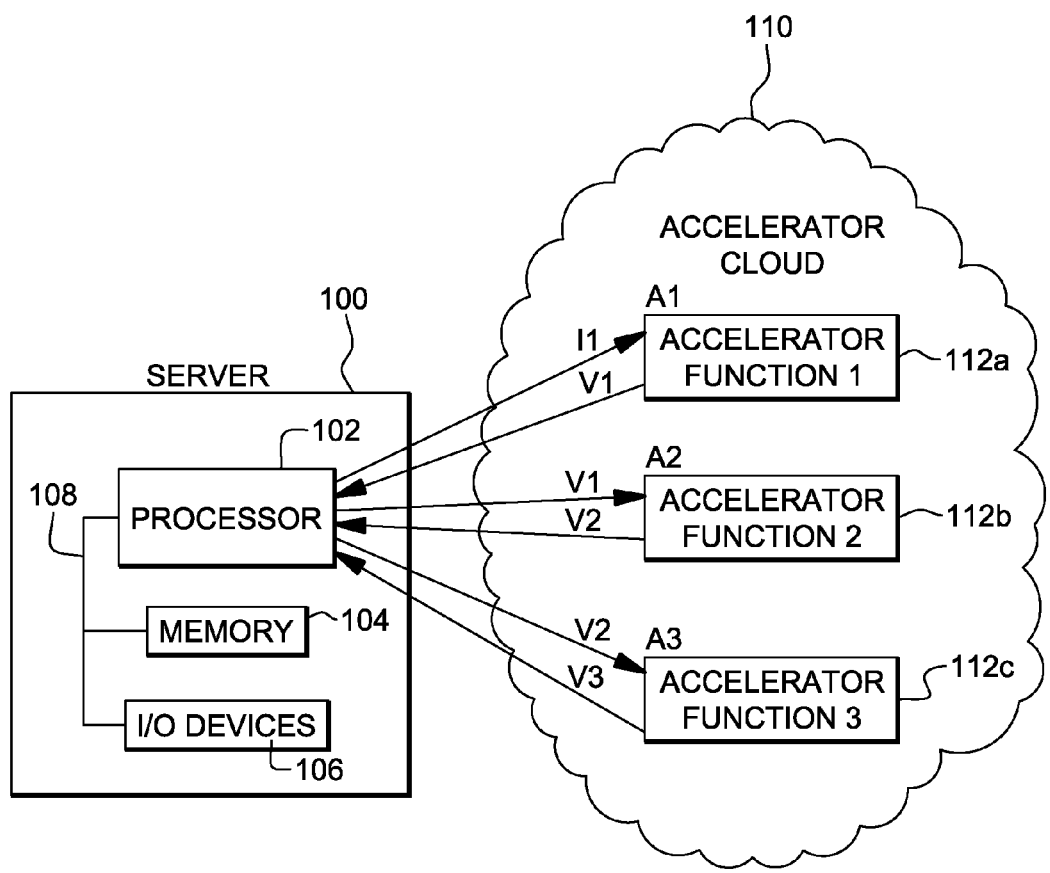
FIG. 1 depicts one example of a conventional computing environment that includes a server coupled to a plurality of accelerators.

Referring to FIG. 1, a server 100, including one or more processors 102, memory 104 and one or more input/output devices 106 coupled to one another via one or more buses 108, is coupled to an accelerator cloud 110. The accelerator cloud includes a plurality of accelerators 112 (e.g., accelerators 112a-112c). During runtime of a program on the server, the server sends a request (I1) to accelerator 112a to perform a function F1. Accelerator 112a runs compute function F1, with the host request as input. Accelerator 112a then returns a result value V1 to the server.

The server then sends V1 to accelerator 112b. Accelerator 112b runs a function F2, with V1 as input. Then, accelerator 112b returns a result value V2 to the server. The server turns around and sends V2 to accelerator 112c. Accelerator 112c runs a function F3, with V2 as input. Accelerator 112c then returns a result V3 to the server. Thus, in this mode of processing, referred to herein as normal circuit mode processing, the server receives a result from each of the accelerator performed functions.

In contrast, in accordance with one or more aspects of the present invention, return traffic to the server is avoided by localizing the traffic in the accelerator cloud coupled to the server. For instance, the server sends a request to an accelerator $A_N$ (where N=1 to the number of accelerators in the cloud), accelerator $A_N$ performs the function, and instead of returning the result to the server, forwards the result directly to another accelerator function. This another accelerator function may be in accelerator $A_N$ or another accelerator, such as accelerator $A_N+1$. Accelerator $A_N+1$ is the next accelerator that accepts the result from $A_N$. It may or may not be the next successive accelerator.

In one particular example, a compiler determines during compilation of a program to be run on a processor of the server whether a result of a function to be performed by an accelerator coupled to the processor can be directly forwarded to another accelerator function (on the same or different accelerator) bypassing the processor. In response to the compiler determining that the processor can be bypassed, the compiler short-circuits the accelerator functions, such that the result of one accelerator function is directly forwarded to the another accelerator function.

The compiler may be a static compiler or a dynamic compiler. For instance, a program may be compiled statically and launched for execution after compiler action is terminated. A workload may also choose to provide instructions to a dynamic compiler that runs in tandem with a running workload and exists for the duration of the workload run. The dynamic compiler generates machine code when required by the workload. The steps performed by the compiler may also be performed by a programmer or other software program (e.g., a preprocessor) before the program is executed, prior to compilation, or during runtime, as examples.

In a further aspect of the present invention, if during runtime of the program it is determined that the localization of traffic in the accelerator cloud is to be reversed, the cascading is broken and the results are forwarded back to the server.

One embodiment of a computing environment to incorporate and use one or more aspects of the present invention is described with reference to FIG. 2. In this particular example, a computing environment 200 includes a server 202 coupled to an accelerator cloud 204. Server 202 is, for instance, a System p®, System x® or System z® server offered by International Business Machines Corporation, and includes, for instance, one or more processors 206, a memory 208, and one or more I/O devices 210 coupled to one another via one or more buses 212. IBM®, System p®, System x® and System z® are registered trademarks of International Business Machines Corporation, Armonk, N.Y. Other names used herein may be registered trademarks, trademarks or product names of International Business Machines Corporation or other companies.

Server 202 communicates with accelerator cloud 204 via, for instance, a network, such as PCI Express, InfiniBand, Ethernet, etc. Accelerator cloud 204 includes, for instance, a plurality of hardware accelerators 220 (e.g., accelerators 220a-220c), such as a plurality of blades in a blade center or chassis. Example accelerators include, for instance, IBM® Cell BE, nVidia GPUs, IBM® Datapower etc. An accelerator cloud may include a mix of different accelerator types. In one example, each accelerator has a switch associated therewith having one port as an input port from the server, one port as an output port to the server and another port used to communicate with another accelerator.

Although, in this example, three accelerators are shown, it will be understood that more or less accelerators may be included in the accelerator cloud, and there may be more than one accelerator cloud. Further, although in this example, each accelerator performs one function, in a further embodiment, one accelerator could perform one or more functions. For instance, accelerator 220a could perform functions 1 and 2, eliminating one of the accelerators. Many configurations are possible. Regardless of the configuration, in accordance with an aspect of the present invention, accelerator functions are cascaded bypassing the return of results to the processor requesting the function.

Figure 2:
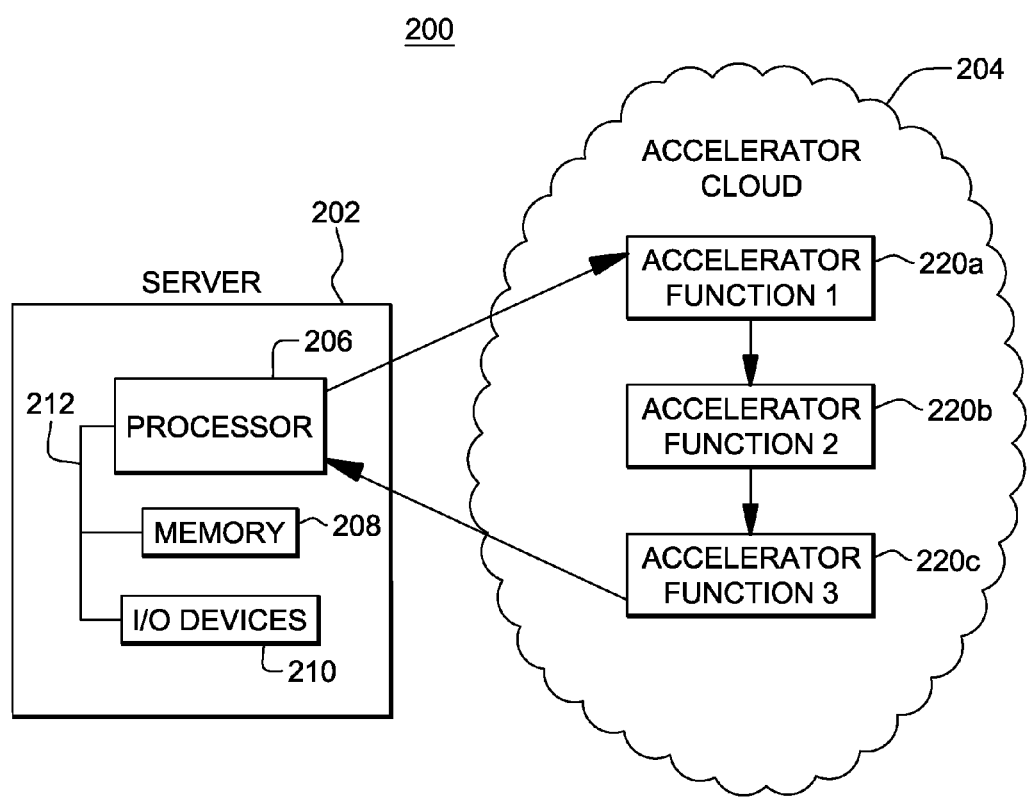
FIG. 2 depicts one example of a computing environment to incorporate and use one or more aspects of the present invention.

Continuing with FIG. 2, in one embodiment, server 202, and in particular, processor 206, sends a request to accelerator 220a to perform function F1. Accelerator 220a performs function F1 and then provides the result of that function. If during compilation of the program it is determined that the result of function F1 can be forwarded directly to accelerator function F2, which may be in the same or different accelerator, then the result of function F1 is forwarded directly to function F2, bypassing processor 206.

Figure 3:
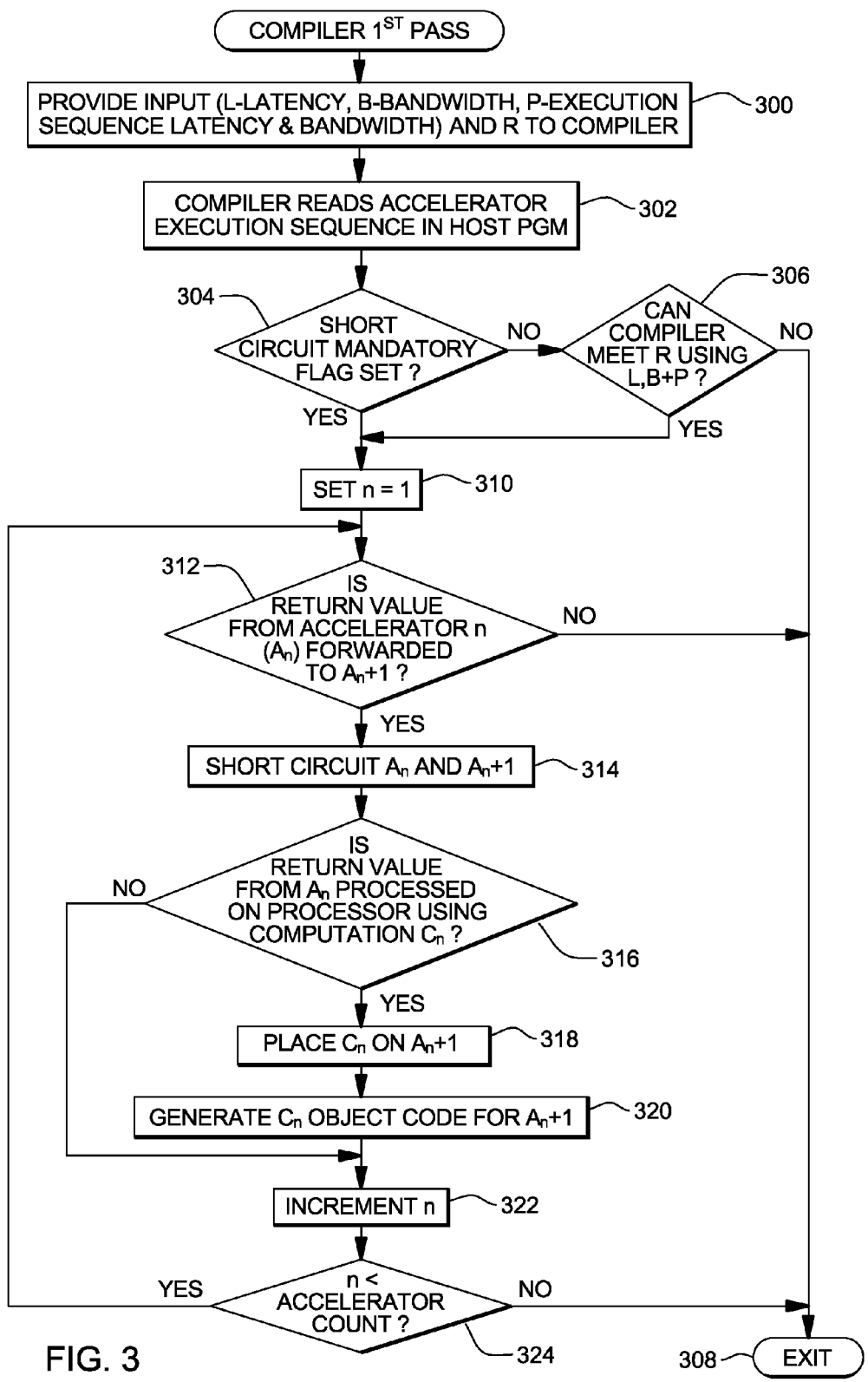
FIG. 3 depicts one embodiment of logic performed during a first pass of a compiler to provide short-circuiting of accelerators, in accordance with an aspect of the present invention.
Figure 4:
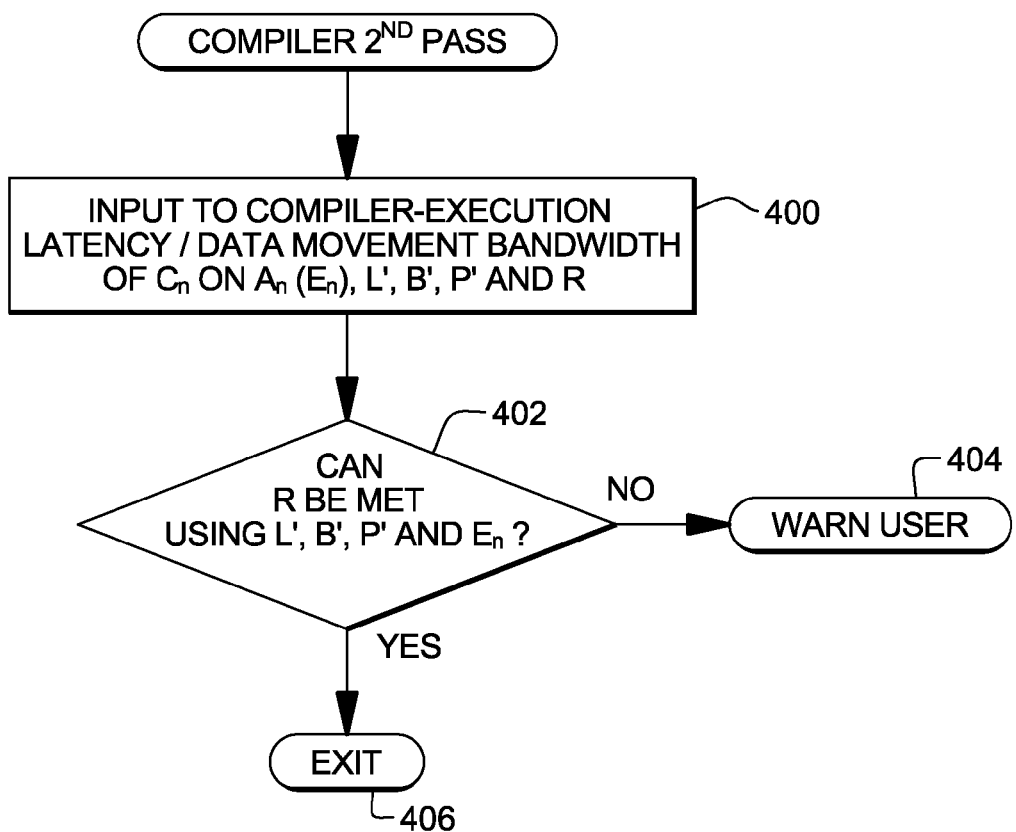
FIG. 4 depicts one embodiment of logic performed during a second pass of the compiler, in accordance with an aspect of the present invention.

As noted above, the decision of where the result is to be provided is, at least initially, determined during compilation of a program to be run on a processor within the server. In one embodiment, the compiler makes two passes through the program. One embodiment of the first pass is described with reference to FIG. 3, and one embodiment of the second pass is described with reference to FIG. 4. The compiler executes on the processor in which the program is compiled, as an example, and its type depends on the language of the program. The compiler produces machine code for the program. In the example of FIGS. 3 and 4, each accelerator function executes on a separate accelerator. However, in other embodiments, this may not be so.

Referring to FIG. 3, initially, the programmer of the program provides input to the compiler via, for instance, a file that includes various measured performance metrics, STEP 300. These metrics include, for instance, measured latency between the processor and accelerators and latency between the accelerators (L); measured bandwidth between the processor and the accelerators and bandwidth between the accelerators (B); and measured accelerator function execution sequence latency and bandwidth (memory or I/O) (P). In one example, there is a latency and bandwidth (bits/sec) metric for each processor/accelerator pair and each pair of accelerators. For instance, assume processor P1 and accelerators A1, A2 and A3. For this configuration, there is a latency (L) and bandwidth (B) metric for P1/A1, P1/A2, P1/A3, A1/A2 and A2/A3. The accelerator function execution sequence latency is the time it takes an accelerator to execute a particular function, and accelerator execution bandwidth is the rate at which data comes into this fragment of instructions and the rate at which the data leaves the fragment. Accelerator execution bandwidth also includes memory bandwidth required on the accelerator to perform a certain function. These metrics are measured, for instance, by profiling the accelerator function on an actual physical system before the compiler is run. That is, the function is run and the measurements are taken. Further, input to the compiler is R, which is the required overall execution latency and bandwidth.

Subsequent to receiving the input, the compiler reads the accelerator execution sequence in the program to be executed, STEP 302. A determination is made as to whether a short-circuit mandatory flag is set, INQUIRY 304. That is, a programmer may determine that regardless of the performance metrics that short-circuiting is to be performed. If the mandatory flag is not set, then a determination is made as to whether the compiler can meet the overall requirement R using measured accelerator function execution sequence performance requirements (P), latency (L) metrics, and bandwidth (B) metrics associated with the appropriate processor/accelerator pair (the accelerator depends on the function to be performed), INQUIRY 306. For instance, assume the latency requirement to execute a whole accelerator execution latency is 10 microseconds (R). Also, assume it takes five microseconds from the processor to the first accelerator and it takes five microseconds to transport and compute on the accelerators (L, P). Additionally, it takes 6 microseconds from the last accelerator back to the host processor. The total time to execute the accelerator execution sequence is 5+3+6=14 microseconds. This exceeds the latency requirement (R) by four microseconds. Thus, in one example, the compiler notifies the programmer that the requirement is not met. Similar exemplary embodiments can be constructed for I/O bandwidth and memory bandwidth.

Continuing with FIG. 3, if the compiler cannot meet the requirements, then processing ends, STEP 308. However, if the compiler can meet the requirements or if the short-circuit mandatory flag is set, then processing continues, as described below.

Initially, a value N is set to one, STEP 310. The compiler determines whether the program code is written such that the return value from accelerator $A_N$ (or acceleration function $A_N$) is to be forwarded to accelerator AN+1 (or accelerator function $A_N$+1), INQUIRY 312. If not, then processing is complete, STEP 308. Otherwise, the compiler short-circuits $A_N$ and $A_N$+1, STEP 314. That is, in generating the machine code for the accelerator, a directive is placed in the message sending module to send the message including the result to $A_N$+1, instead of the processor.

Thereafter, a determination is made as to whether the return value from $A_N$ is to be further processed on the processor using computation $C_N$, INQUIRY 316. If so, then $C_N$ is placed on $A_N$+1, STEP 318, and object code for $C_N$ is generated for $A_N$+1, STEP 320. Thereafter, or if the response to INQUIRY 316 is negative, N is incremented (e.g., by 1), STEP 322.

Next, a determination is made as to whether N is less than the accelerator count (e.g., the number of accelerators in the cloud), INQUIRY 324. If so, then processing continues with INQUIRY 312 for the next set of accelerators (e.g., A2 and A3); otherwise processing is complete, STEP 308.

Now that the short-circuiting is complete and other processing may have been placed on the accelerators (e.g., $C_N$) during the first pass through the program by the compiler, a second pass is performed to determine if there are any inefficiencies that can be detected. One embodiment of this logic is described with reference to FIG. 4. In one example, this logic is performed for each accelerator that includes $C_N$.

Referring to FIG. 4, input is provided to the compiler that includes the execution latency/data movement bandwidth of $C_N$ on $A_N$ ($E_N$), as well as L', B', P' and R, STEP 400. In this compilation pass, L', B' and P' are measured computations with $C_N$ running on the accelerator. Thereafter, a determination is made as to whether R can be met using $E_N$, L', B' and P', INQUIRY 402. If not, the user is warned of failure of meeting the performance requirements, STEP 404, and processing completes, STEP 406. If the requirements can be met, INQUIRY 402, then processing is complete, STEP 406.

In a further embodiment of the invention, processing can be dynamically switched from short-circuit mode to normal circuit mode during runtime of the program. Examples of this processing are described with reference to FIGS. 5 and 6. In particular, FIG. 5 describes one embodiment of the logic associated with coordinated action between the processor and accelerator during runtime to dynamically switch back to normal circuit mode; and FIG. 6 depicts one embodiment of the logic associated with accelerator action during runtime to dynamically switch to normal circuit mode. The logic of FIG. 5 runs on each accelerator and processor, and the logic of FIG. 6 runs on each accelerator. In this particular example, each accelerator function executes on its own accelerator, but this may not be true in other embodiments.

Figure 5:
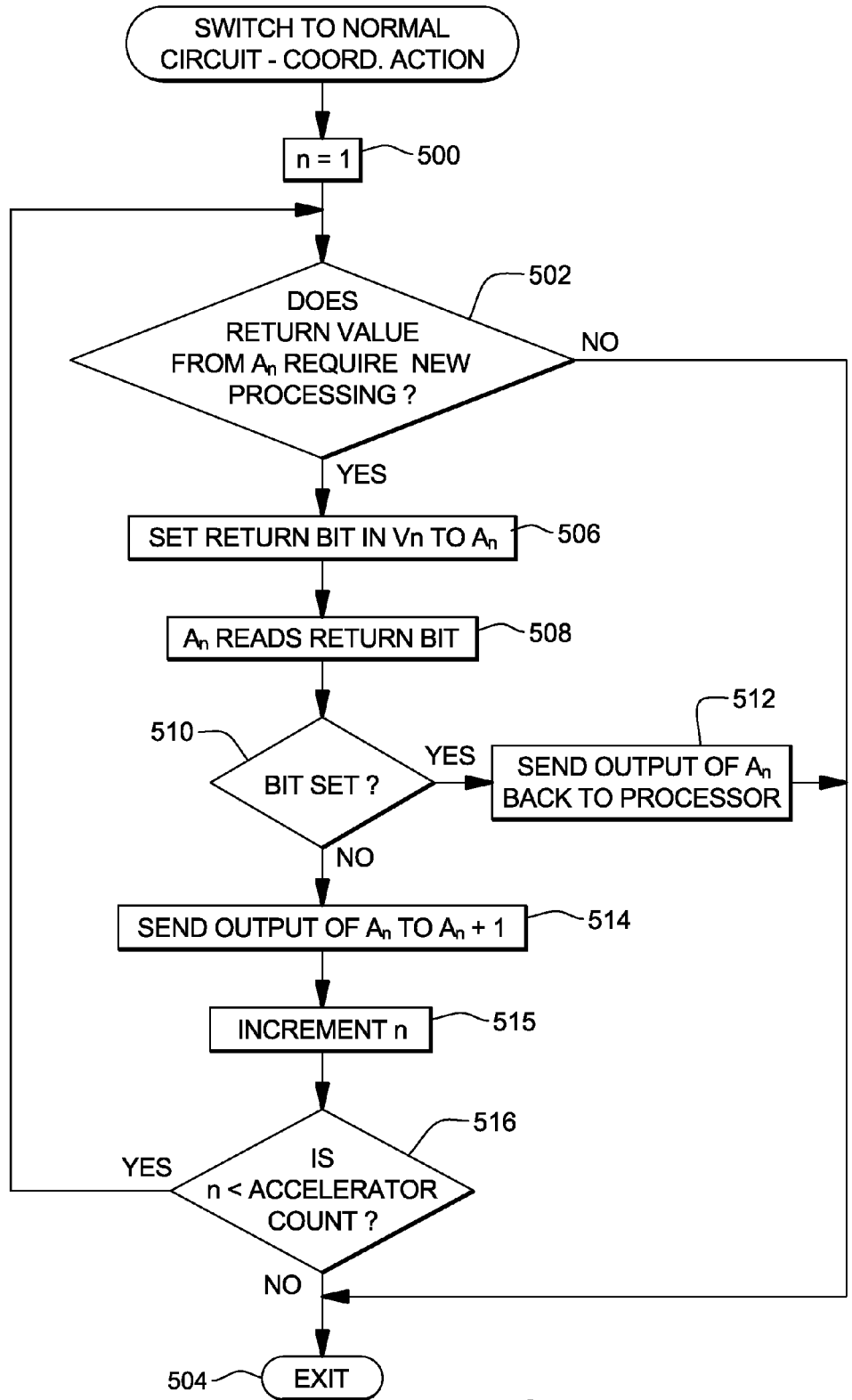
FIG. 5 depicts one embodiment of the logic to perform coordinated action between the server and accelerators to dynamically switch short-circuit mode to normal circuit mode, in accordance with an aspect of the present invention.
Figure 6:
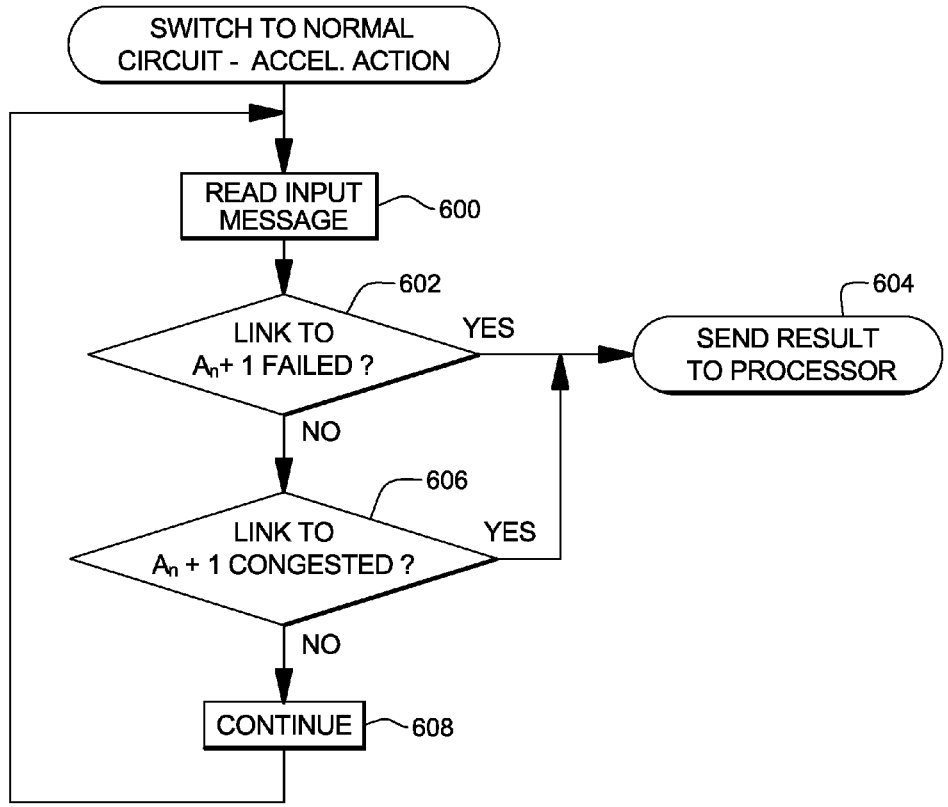
FIG. 6 depicts one embodiment of the logic performed by the accelerator to switch back from short-circuit mode to normal circuit mode, in accordance with an aspect of the present invention.

Referring initially to FIG. 5, N is set to 1, STEP 500. Then, a determination is made by the processor executing the program as to whether the return value from $A_N$ requires new processing, INQUIRY 502. The new processing requirements were determined, in one example, during execution of the cascaded accelerator functions by the processor. If not, then this processing is complete, STEP 504. Otherwise, a return bit is set in a return field of a message $V_N$ to be sent to accelerator $A_N$ by the processor, STEP 506. In another example, the processor may set a return bit in a bit field, the position of the bit corresponding to an accelerator that is required to send a result back to the processor. In this case the processor sends, for instance, a message V1 to A1 with the bit field embedded in an accelerator computation request message. The bit field is sent from one accelerator to the other along with the computation result, for each accelerator to inspect and act, if needed.

Next, accelerator $A_N$ reads the return bit, STEP 508. If the bit is set, INQUIRY 510, then the output is sent back to the processor, STEP 512. Otherwise, if the bit is not set, then short-circuiting continues and the output of AN is sent directly to AN+1 bypassing the processor, STEP 514.

Moreover, N is incremented (e.g., by 1), STEP 515, and a determination is made as to whether N is less than the accelerator count, STEP 516. If so, then processing continues with INQUIRY 502; otherwise, processing is complete, STEP 504.

Turning now to FIG. 6, an embodiment is described in which the accelerator determines that short-circuiting is to be suspended for a particular accelerator function invocation. In on example, this logic is executed on each accelerator during runtime execution.

Referring to FIG. 6, initially, an input message is read by an accelerator, $A_N$, STEP 600. The accelerator performs the function indicated in the message, and then decides whether to forward the result to the processor sending the message or to the next accelerator, $A_N$+1. Therefore, a determination is made as to whether the link to $A_N$+1 has failed, INQUIRY 602. If it has failed, then the result is sent to the processor, STEP 604.

Otherwise, a determination is made as to whether the link to $A_N$+1 is congested, INQUIRY 606. If so, then the result is sent to the processor, instead of the next accelerator, STEP 608. That is, when a message is sent to the accelerator, it is processed, the result is placed on an output wait queue and a timer is set. If the timer exceeds a user-defined threshold, then the result of the accelerator function is sent directly to the processor, instead of the following accelerator. However, if the link is not congested, then the result is forwarded to the next accelerator. Processing then continues in the accelerator cloud, STEP 608, in which a new packet (message) is examined, STEP 600. (Note that other reasons besides a failed and congested link may be used to dynamically steer the data.)

Figure 7:
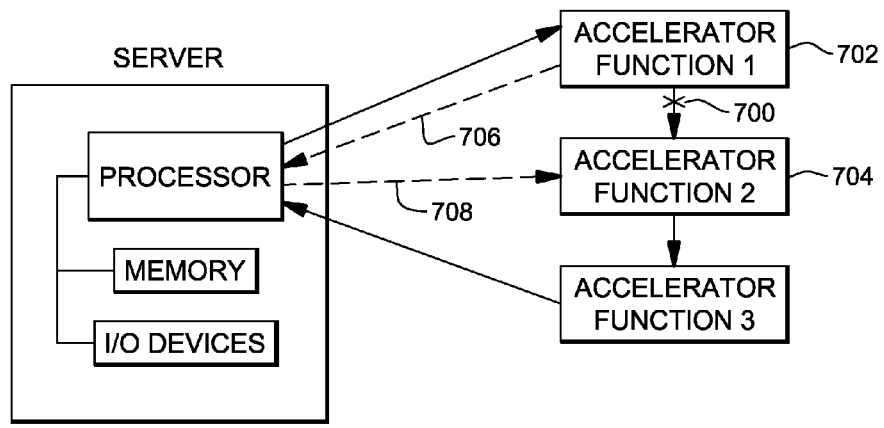
FIG. 7 pictorially depicts dynamically reverting from short-circuited accelerator functions back to having a return path to the server, in accordance with an aspect of the present invention.

FIG. 7 pictorially depicts a situation in which a link 700 between accelerator 1 (702) and accelerator 2 (704) is unavailable, and therefore, the result 706 is returned to the processor, and the processor then forwards that result 708 on to accelerator 2. The link may be unavailable for a number of reasons including, but not limited to, failure, congestion, lack of timeliness, poor performance, etc.

Described in detail above is a technique for cascading accelerator functions. Compile-time and/or explicit programmer encoding is used to specify the forwarding of data between one accelerator function and another accelerator function or between an accelerator function and the host processor. Further, runtime compiler/runtime scheduler information is used to dynamically reverse the compile time decision on a per message basis. The runtime scheduler is run on each accelerator, as well as the host processor. The runtime information can be based on availability of a link, congested links, timeliness of links, performance of a link, distance between accelerators and/or accelerator clouds, etc. Time critical data is forwarded from one accelerator to the other, and data is forwarded between accelerators in a bi-directional manner. For example, in FIG. 2, accelerator 220a and 220b can exchange messages bidirectionally.

In one embodiment, the computation blocks placed in the accelerators are placed close to one another to minimize latency. For large accelerator fabrics with possibly multiple switch hops between accelerator computation blocks, a distance map stored on the server allows computation to be placed on the accelerator fabric to reduce latency. Such placement is provided because multiple processors on the server might access computation blocks on the accelerator cloud with possible contention for nearest neighbor positions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electro-magnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 8:
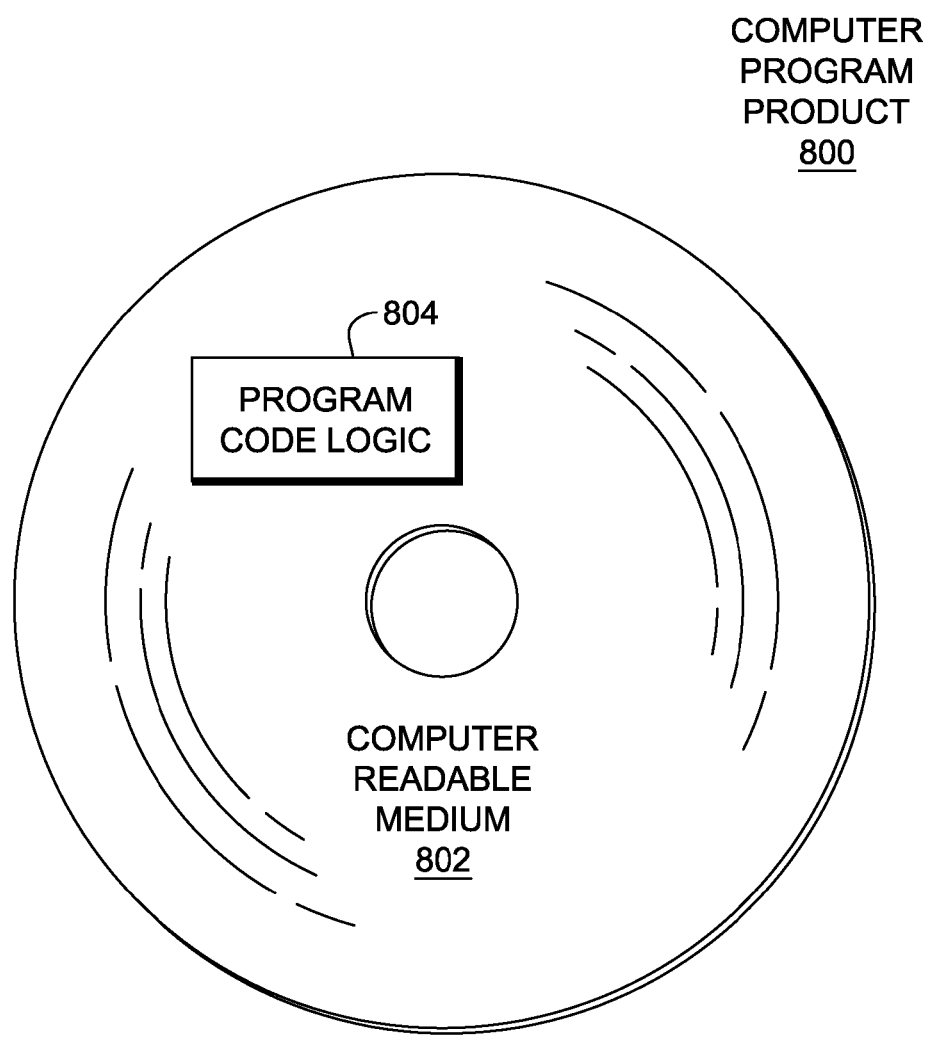
FIG. 8 depicts one embodiment of a computer program product incorporating one or more aspects of the present invention.

Referring now to FIG. 8, in one example, a computer program product 800 includes, for instance, one or more computer readable media 802 to store computer readable program code means or logic 804 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Although various embodiments are described above, these are only examples. For example, computing environments of other architectures can incorporate and use one or more aspects of the present invention. Additionally, other types of accelerators may be used. Further, there may be more or less accelerators, and each accelerator may run one or more functions. Moreover, other metrics may be used. Many other variations are possible.

Further, other types of computing environments can benefit from one or more aspects of the present invention. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiment with various modifications as are suited to the particular use contemplated.

What is claimed is:

1. A computer program product for facilitating processing within a computing environment, the computer program product comprising:
   a non-transitory storage medium readable by a processing circuit and storing instructions for execution by the processing circuit for performing a method comprising:
      determining whether a result of an accelerator function is to be forwarded to another accelerator function, the accelerator function encountered in a program and to be processed by an accelerator; and
      based on the determining indicating the result is to be forwarded to the another accelerator function, generating machine code to provide the result directly to the another accelerator function, bypassing a processor to execute the program.

2. The computer program product of claim 1, wherein the method further comprises:
   deciding, during runtime of the program, that the processor is not to be bypassed; and receiving by the processor, based on the deciding, the result, wherein the result is provided to the processor rather than directly to the another accelerator function.

3. The computer program product of claim 2, wherein the method further comprises forwarding the result from the processor to the another accelerator function.

4. The computer program product of claim 2, wherein the deciding includes determining that the result is to be subject to new processing.

5. The computer program product of claim 2, wherein the deciding comprises having an indication that a link coupled the accelerator function and the another accelerator function is unavailable.

6. The computer program product of claim 5, wherein the link is unavailable due to one of link failure, congestion on the link, lack of timeliness on the link, or unacceptable performance on the link.

7. The computer program product of claim 1, wherein the another accelerator function is on another accelerator, the another accelerator being physically distinct from and coupled to the accelerator.

8. The computer program product of claim 1, wherein the determining includes deciding that a compiler to compile the program can meet a specified performance metric based on input to the compiler.

9. The computer program product of claim 1, wherein the method further comprises:
    determining whether a computation module is used in processing the result; and
    including the computation module on an accelerator to execute the another accelerator function, said computation module to be used in processing the result.

10. A computer system for facilitating processing within a computing environment, said computer system comprising:
    a memory; and
    a processor in communications with the memory, wherein the computer system is capable of performing a method, said method comprising:
        determining whether a result of an accelerator function is to be forwarded to another accelerator function, the another accelerator function encountered in a program and to be processed by an accelerator; and
        based on the determining indicating the result is to be forwarded to the another accelerator function, generating machine code to provide the result directly to the another accelerator function, bypassing a processor to execute the program.

11. The computer system of claim 10, wherein the method further comprises:
    deciding, during runtime of the program, that the processor is not to be bypassed; and
    receiving by the processor, based on the deciding, the result, wherein the result is provided to the processor rather than directly to the another accelerator function.

12. The computer system of claim 11, wherein the method further comprises forwarding the result from the processor to the another accelerator function.

13. The computer system of claim 10, wherein the another accelerator function is on another accelerator, the another accelerator being physically distinct from and coupled to the accelerator.

14. The computer system of claim 10, wherein the determining includes deciding that a compiler to compile the program can meet a specified performance metric based on input to the compiler.

15. The computer system of claim 10, wherein the method further comprises:
    determining whether a computation module is used in processing the result; and
    including the computation module on an accelerator to execute the another accelerator function, said computation module to be used in processing the result.

16. A method of facilitating processing within a computing environment, said method comprising:
    determining, by a first processor, whether a result of an accelerator function is to be forwarded to another accelerator function, the accelerator function encountered in a program and to be processed by an accelerator; and
    based on the determining indicating the result is to be forwarded to the another accelerator function, generating machine code to provide the result directly to the another accelerator function, bypassing a second processor to execute the program.

17. The method of claim 16, wherein the first processor and the second processor are the same processor.

18. The method of claim 17, wherein the first processor and the second processor are different processors.

19. The method of claim 16, further comprising:
    deciding, during runtime of the program, that the second processor is not to be bypassed; and
    receiving by the second processor, based on the deciding, the result, wherein the result is provided to the second processor rather than directly to the another accelerator function.

20. The method of claim 16, further comprising:
    determining whether a computation module is used in processing the result; and
    including the computation module on an accelerator to execute the another accelerator function, said computation module to be used in processing the result.

* * * * *